(12) United States Patent
Arias

(10) Patent No.: US 6,651,885 B1
(45) Date of Patent: Nov. 25, 2003

(54) MULTI-FUNCTION TRANSACTION PROCESSING SYSTEM

(76) Inventor: Luis A. Arias, 11600 NW. 34th St., Miami, FL (US) 33178

( * ) Notice: Subject to any disclaimer, the term of this patent is extended or adjusted under 35 U.S.C. 154(b) by 485 days.

(21) Appl. No.: 09/588,917

(22) Filed: Jun. 8, 2000

(51) Int. Cl.$^7$ ................................. G06F 7/08
(52) U.S. Cl. .............. 235/381; 235/383; 235/462; 705/1; 705/16; 705/44; 700/233; 700/231
(58) Field of Search .................. 235/375, 376, 235/380, 381, 382, 382.5, 383, 432, 462, 470, 472; 705/1, 16, 17, 18, 44, 43, 14; 700/231–244

(56) References Cited

U.S. PATENT DOCUMENTS

| | | | | |
|---|---|---|---|---|
| 4,359,631 A | * | 11/1982 | Lockwood et al. | 235/381 |
| 4,567,359 A | * | 1/1986 | Lockwood | 235/381 |
| 4,818,854 A | * | 4/1989 | Davies et al. | 235/381 |
| 5,243,174 A | * | 9/1993 | Veeneman et al. | 235/381 |
| 5,250,789 A | * | 10/1993 | Johnsen | 705/14 |
| 5,687,087 A | * | 11/1997 | Taggart | 700/233 |

* cited by examiner

Primary Examiner—Richard Chilcot
(74) Attorney, Agent, or Firm—Malloy & Malloy, P.A.

(57) ABSTRACT

A multi-function transaction processing system including a transaction terminal having a data entry facility and a transaction processor, the transaction processor being communicatively associated with a control processor that defines user accounts and issues one or more authorization codes associated with the user account(s) in response to payment authorities provided at the transaction terminal utilizing a payment authority input of the data entry facility. Furthermore, a printer assembly is communicatively associated with the transaction terminal and generates a card assembly, the card assembly including a first portion containing the authorization code thereon, and a second portion including additional promotional materials thereon. The user account as defined by the control assembly, includes a defined value, the authorization code provided being utilized to facilitate a transaction in accordance with that defined value.

53 Claims, 1 Drawing Sheet

MULTI-FUNCTION TRANSACTION PROCESSING SYSTEM

BACKGROUND OF THE INVENTION

1. Field of the Invention

The present invention relates to a multi-function transaction processing system which may be disposed at a commercial location in order to complete a variety of commercial transactions, including credit/debit card purchases, while also facilitating one or more alternate, commercially advantageous functions including the issuance of authorization codes for purposes related to pre-paid telephony service, Internet purchases, lottery purchases, and the like. Furthermore, the multi-function transaction processing system provides an effective source for the dissemination of a variety of promotional materials in connection with the transaction being completed utilizing the system.

2. Description of the Related Art

With the ever increasing popularity of credit or debit card payments at commercial establishments, it is becoming increasingly commonplace to find small credit card transaction terminals at commercial establishments such as grocery stores, gas stations, convenience stores, and the like. Typically, these conventional credit/debit card transaction terminals are linked to an affiliated service so as to provide for the approval of a particular transaction, thereby facilitating payment to the merchant. Such traditional transaction terminals are, however, limited to providing authorization for a particular purchase in lieu of a cash payment for products or services that are normally offered by the merchant. As a result, while they are a convenience for the operators of commercial establishments, they do not provide any added commercial advantage to the commercial establishment. Indeed, the convenience factor is generally the only factor to offset the service fees that must typically be paid by the commercial establishments to the authorizing entity. As a result, it would be beneficial to provide an enhanced transaction terminal as part of a transaction system, which in addition to facilitating traditional credit\debit card purchases, will also provide an added source of economic benefit for the commercial establishments employing such a system, directly as a result of its use.

An example of an added source of revenue that has become increasingly popular for merchants includes the calling card industry, wherein a particular commercial advantage is being attained from the sale of pre-paid calling cards. Specifically, such pre-paid calling cards are typically supplied in bulk to a retail establishment where they may be sold at specific monetary denominations. In essence, each pre-paid, pre-printed calling card provides a purchasing consumer with the appropriate access to a defined amount of telephony connection time. As a result, the consumer, often at a reduced rate, is able to initiate any desired telephony communication from any telephone, without incurring toll or other service charges in connection with that telephone.

Despite advances in the calling card industry, it is often commercially limiting to provide the physical cards to the commercial or retail establishments for appropriate sale to the consumers. For example, if sales are slow at a particular location, an inventory of cards will remain unused and unsold. The fact that a finite amount of air time is purchased by the operators of the card requires that the time remain un-used in case a purchase does indeed occur with regard to a pre-printed account. Conversely, an establishment which makes a large volume of sales may run out of cards and future potential sales will be lost as no cards are available. Yet another inconvenience associated with traditional pre-printed calling card relates to the need for inventory space to store large volumes of physical cards, naturally resulting in added expense, and the fact that the cards, once printed, cannot be changed if retail identity, rates, etc., change, and provide an actual commodity susceptible to theft or other misappropriation.

To this end, others in the art have sought to develop individual card printing devices. Specifically, such devices are generally standard printing devices that print a particular calling card on demand, thereby minimizing the space and inventory requirements of the commercial establishments and permitting at least a degree of variability, such as in connection with card denominations. Unfortunately, however, such systems are still severely limited, as each card printing terminal is provided with a finite number of access codes to be printed on a finite number of calling cards. Typically, a quantity of the access codes are downloaded into the individual terminal at a predetermined period of time, in much the same manner that traditional cards are stocked at the establishment. As a result, they do not alleviate the problems associated with outstanding, unsold access codes/pin numbers, or the loss of sales after depletion of an initially defined volume of cards. Furthermore, such terminals are merely printers which print a number of a cards, and they do not provide any further business enhancing qualities or functions which provide a commercial advantage to the establishment utilizing the terminal, beyond merely the sale of a calling card.

Accordingly, there is still a need in the art for a calling card system which does not have to be limited in terms of quantities sold, allows for complete card versatility, and ensures that proper utilization of all resources is maintained without waste or storage problems. Additionally, such a transaction system should provide enhanced functionality so as to provide a variety of commercially advantageous services/products for a particular establishment, providing consumer incentive for the calling card purchases and to provide a mechanism via which the costs associated with the calling card to the retail or distributor can be offset through the association of alternative commercial endeavors, such as promotions and other services.

The present invention also recognizes that given the advances of global computerized network communications and commerce, increased purchase avenues are continuously being made available to consumers. Unfortunately, however, many traditional consumers still have security concerns associated with consummating such electronic transactions, especially if they will be required to transmit credit/debit card information to the merchant. Moreover, in some circumstances, privacy concerns also restrict a consumer's desire to make certain purchases by traditional means. As a result, it would be beneficial to provide a transaction system which is capable of offering prepaid services which can not only be utilized for such traditional services as telephony communication, but which also provides a means through which a consumer can establish a prepaid purchase, utilizing that pre-payment for any of a variety of products or services.

SUMMARY OF THE INVENTION

The present invention is directed to a multi-function transaction processing system. The transaction processing system includes a transaction terminal that may be disposed at any establishment, including a commercial or retail type establishment. In particular, the transaction terminal includes a data entry facility and a transaction processor associated therewith. Moreover, the transaction processor, which facilitates a variety of the operational functions of the transaction terminal, is communicatively associated with a control processor.

The data entry facility associated with the transaction terminal includes a payment authority input which accepts a payment authority, such as a credit card transaction or acknowledgment of cash payment. In this regard, the control processor is structured to define a user account, and to issue an authorization code associated with the user account at least in response to a payment authority received at the transaction terminal.

The transaction processing system of the present invention may also include a printer assembly. The printer assembly is communicatively associated with the transaction terminal and is structured to at least generate a card assembly. In the illustrated embodiment, the card assembly many be generally elongate, including one or more portions. For example, a first portion of the card assembly many include at least the authorization code thereon, while a second portion of the card assembly many include promotional materials thereon. As such, when a consumer completes an appropriate transaction where an authorization code is required for a particular future transaction, the consumer will be provided with the card assembly to facilitate their maintenance and/or conveyance of the authorization code. Conversely, the second portion may include promotional materials which can be distributed to the consumer and provides an incentive for consumer purchase.

Additionally, the user account defined by the control processor includes a defined value. The defined value is at least partially determined by the payment authority that has been provided at the transaction terminal utilizing the data entry facility. As a result, the authorization code facilitates the subsequent transaction in accordance with that defined value, while the control processor provides necessary confirmations or validations.

These and other features of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As illustrated in the figures, the present invention is directed to a multi-function transaction processing system, generally indicated as 10. The transaction processing system 10 is structured to coordinate and facilitate a variety of different transactions in an efficient and integrated manner which provides an increased commercial benefit beyond what is normally available to a merchant utilizing the transaction processing system 10.

Figure 1:
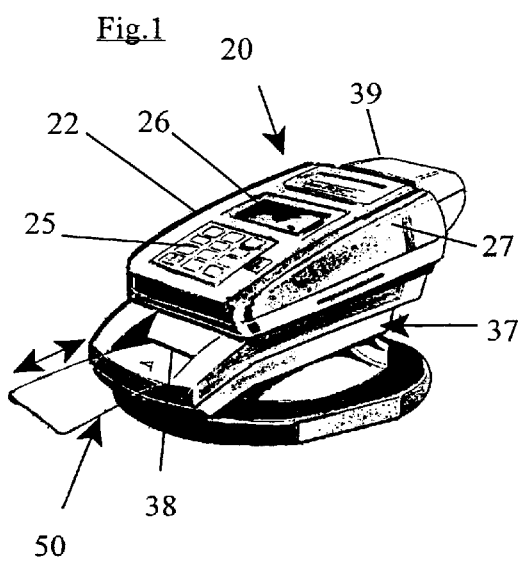
FIG. 1 is a perspective illustration of an embodiment of the transaction terminal and printer assembly associated with the system of the present invention.
Figure 2:
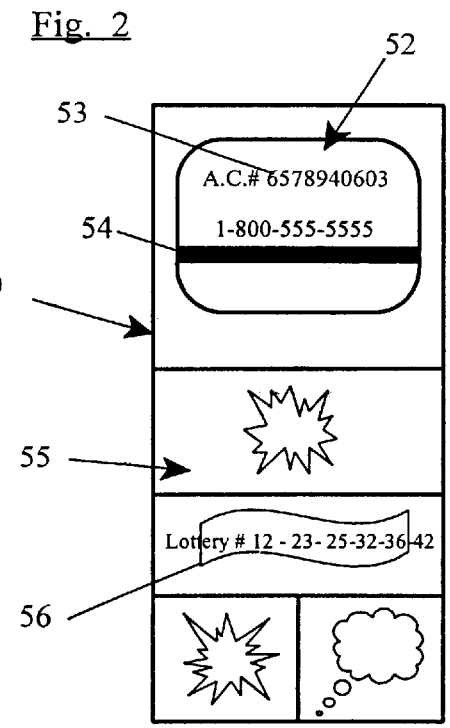
FIG. 2 is a illustration of the card assembly of an embodiment of the present invention.
Figure 3:
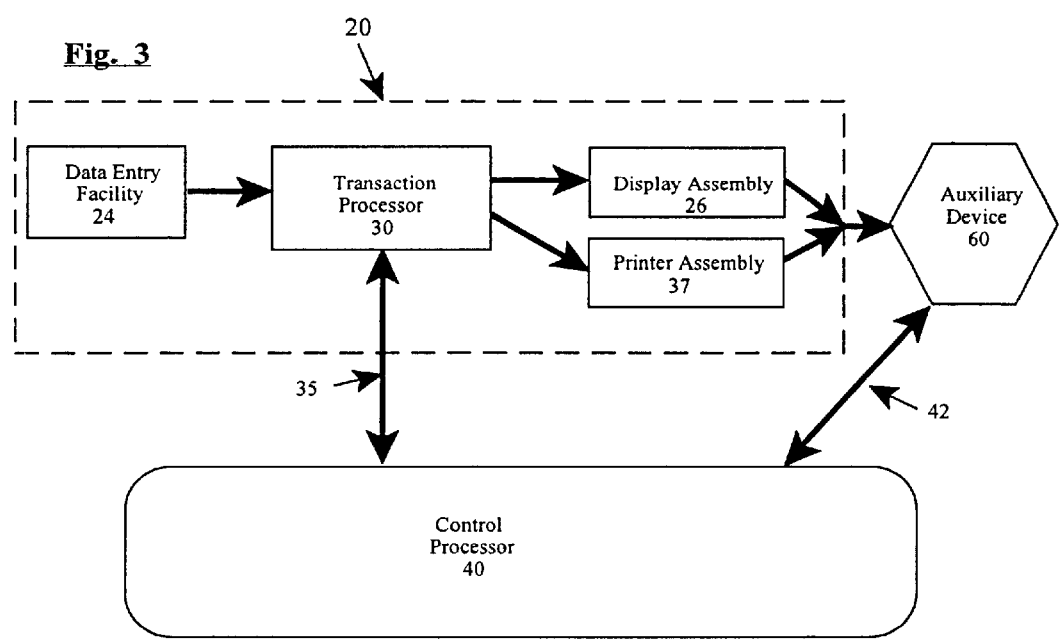
FIG. 3 is a schematic representation of an embodiment of the multi-function transaction processing system of the present invention.

Looking to an embodiment of the transaction processing system 10, as illustrated in FIGS. 1–3, the transaction processing system 10 includes at least one transaction terminal 20. The transaction terminal 20 is preferably generally compact and convenient to position within a facility, such as secured directly to a checkout counter or similar location. In this regard, it is recognized that the transaction terminal 20 may be configured and positioned so as to permit its use directly or interactively by a consumer, or to require only an authorized person, such as the merchant, to utilize the transaction terminal 20 to complete the desired transactions of their consumers.

The transaction terminal 20 includes at least a data entry facility 24 and a transaction processor 30. The data entry facility 24 may include one or more of a variety of conventional input facilities, including a keypad 25 which may be separate or integrated as part of a touch screen, a magnetic stripe reader 27 through which a credit or debit card many be passed, and/or any other data entry facility such as a bar code scanner or other scanning device. Furthermore, included as part of one or more aspects of the data entry facility 24 is a payment authority input by which a payment authority may be received and/or communicated to the transaction processor 30. As such, any of the previously mentioned types of the data entry facility 24 many qualify as the payment authority input, although in the illustrated embodiment the payment authority input includes the keypad 25 and the magnetic stripe reader 27. Additionally, in the illustrated embodiment, the data entry facility 24 may also include an electronic signature capture assembly, such as integrated as part of a display assembly 26. Specifically, such an electronic signature capture assembly 26 is structured to permit a consumer to make an electronic signature directly thereon, thereby avoiding the need for a carbon receipt to be signed by the consumer, and eliminating the need for a merchant to maintain paper receipts of purchases.

As such, utilizing one or more of the different types of data entry facility 24 configurations recited, a consumer is able to provide a desired payment authority at the transaction terminal 20, which is then communicated to the transaction processor 30. For example, if the consumer wishes to make a purchase from the merchant utilizing the transaction terminal 20, they may pay cash in a traditional fashion or may provide a credit or debit type card to the merchant. The merchant is then able to provide credit card transaction information as the payment authority, such as by keying in the appropriate credit card transaction information and/or passing an appropriate card through the magnetic stripe reader 27. In the illustrated embodiment the credit card transaction information includes at least a credit card account and a transaction amount as the payment authority. It is, however, recognized that the credit card transaction information may include additional information, such as credit card expiration date. Moreover, although for purposes of clarity and ease of explanation reference is being made to a credit card transaction and credit card transaction information, it is understood that a check card, smart card, debit card, check or other similar account payment method may be employed in a conventional fashion, the credit card transaction information including the necessary information for processing a particular purchase, sale or transaction in accordance with the payment account selected.

In addition to receiving credit card transaction information as the payment authority, however, the illustrated embodiment of the present invention may also receive an external payment verification, at least partially as the payment authority. Specifically, and for reasons to be described subsequently, a consumer may make a cash or credit card purchase separate from the transaction terminal 20, but may wish to have a further receipt, authorization, promotional item, completion of a further transaction facilitated by the transaction terminal 20. In such an embodiment, preferably utilizing the keypad 25 as the payment authority input, although it is recognized that alternative payment authority inputs, including a direct link to a transaction computer, cash register, or more traditional credit card authorization device may also be employed, an input related to the external payment verification is provided. For example, if the consumer desires to pay cash, the payment authority can be appropriately entered into the transaction terminal 20 as the external payment verification. In such an embodiment the external payment verification indicates the nature and extent of the external payment and, if desired for security reasons, the transaction processor 30 may require an access authorization in connection with the external payment verification. As such, a validity of the external payment verification can be ensured. The access authorization may include, for example, any access code or other security verification including a key, key card, personal identifier, etc., may be provided as the access authorization, an authorized individual associated with the merchant properly providing the access authorization to indicate that the external payment verification is indeed valid and is backed by the external transaction.

The transaction processing system 10 of the present invention also includes a control processor 40. The control processor 40 is communicatively associated with the transaction processor 30 of the transactional terminal 20. In this regard, it is recognized that one or more control processors 40 may be provided and communicatively associated with one or a plurality of transaction processors 30, a large network of transaction terminals 20 being contemplated. Moreover, the communicativity, as at 35, that is established between the transaction processor 30 and the control processor 40 is preferably two way, and may be achieved through any of a variety of structures, including a dedicated connection, a network type connection, a wireless connection, an Internet connection and the like, so long as at least some degree of preferably secure data transmitting communication may be achieved. Along the these lines, the transaction processor 30 is structured to communicate the payment authorities received at the transaction terminal 20 to the control processor 40. Moreover, in some instances, such as with a conventional credit card transaction, the control processor 40 is structured to validate and/or authorize the payment authority, such as by verifying the credit card account information or ensuring that the access authorization associated with an external payment verification is a valid.

In addition to providing such approvals for conventional point of sale type purchases, the control processor 40 is also structured to define a user account and to issue an authorization code associated with the user account, such as for the benefit of a consumer in connection with a further transaction, to be described. Generally, the authorization code and user account are defined by the control processor 40, at least partially in response to the payment authority received at the transaction terminal 20. Furthermore, the user account defined by the control processor 40 may include a defined value, such as a dollar value or transaction quantity/frequency value, which is also at least partially defined by the payment authority. As a result, the authorization code issued by the control processor 40 is structured to facilitate a transaction in accordance with the predefined value of the user account for which the authorization code was issued. As will be described subsequently, the control processor 40 preferably communicates the authorization code to the transaction terminal 20 for communication to the consumer, if necessary.

Although the authorization code defined by the control processor 40 may be communicated to a consumer in a variety of fashions, such as merely by illustrating it on the display assembly 26 of the transactional terminal 20, in the illustrated embodiment, the multi-function transaction processing system 10 also includes a printer assembly 37 through which at least a printout of the authorization code may be provided for the consumer. Specifically, the printer assembly 37 is preferably communicatively associated with the transaction terminal 20 and is structured to generate a card assembly 50. The card assembly 50, which may be constructed of a generally thick card stock type material, may also be generally elongate, as illustrated in FIG. 2, so as to define a greater amount of information receiving surface area. Of course, however, it is recognized that although physical printing of the authorization code 53 on the card assembly 50 is to be described in connection with the illustrated printer assembly 37, other types of printed encoding, such as the making of encoded markings or the appropriate encoding of a magnetic stripe 54, or other data storage structure on the card assembly 50 may also be utilized and are considered within the scope of the present description of printing. In the illustrated embodiment, the card assembly 50 includes at least a first portion 52 and a second portion 55. The first portion 52 include the authorization code 53 thereon, such as in the form of printing of the authorization code directly on the first portion 52. Additionally, in the case of a telephony communication transaction, as will be described, a telephony access number may also be disposed on the first portion 52 of the card assembly, the telephony access number to be utilized to initiate the telephony communication with a telephony server. Furthermore, so as to facilitate usage of the first portion 52 of the card assembly 50 in a manner similar to conventional prepaid calling cards, the first portion 52 may be detachable from the second portion 55, thereby permitting the first portion 52 to be substantially compact such as in the form of a credit card or similar sized structure, or in the form of a smaller structure such as may be hung from a key chain. Also, as seen in FIG. 2, one or more aspects of the card assembly 50 may be provided on a magnetic stripe 54 or other encoded structure in addition to or instead of direct printing on the surface of the card assembly 50.

Looking to the second portion 55 of the card assembly 50, among other items, it preferably includes promotional materials disposed or depicted thereon. Specifically, the promotional materials may include coupons, advertisements and/or a variety of other promotional articles which may be attractive to a consumer, or which a merchant may wish to promote to consumers obtaining an authorization code for a desired transaction. As such, the merchant, distributor or other individuals associated with the transaction terminal 20 may, if desired, achieve an additional source of revenue through payments or offsets from the source(s) of the coupons and or advertisements depicted by the second portion 55 of the card assembly 50. This also, provides an added value to the consumer of the card assembly 50 through the additional promotional items, discounts and the like, thereby adding increase incentive to purchase such a card assembly over other competing products.

Looking in further detail to the specific embodiment of the printer assembly 37 illustrated in FIG. 1, it is preferably generally elongate, and is formed in association with a remainder of the transaction terminal 20. In this regard, the printer assembly 37 may in include an elongate, generally planar slot 38, through which the elongate, potentially stiff card assembly 50 is passed for appropriate printing thereof. Although, it is recognized that in the case of more conventional transactions, or even in most transactions when a consumer desires to have a receipt of their transaction, the printer assembly 37 may also be utilized for that purpose, such as by printing appropriate receipt information directly on a portion of the card assembly 50 or on a separate document. In the embodiment illustrated in FIG. 1, however, a receipt printer 39 may also be provided. The receipt printer 39, which may be considered part of the overall printer assembly, is structured to print a receipt associated with an authorized transaction for the consumer and as a result need not be provided directly on the card assembly 50. In such an embodiment, the receipt printer 39 is as at least partially distinct from the printer assembly 37. As mentioned, however, and still with reference to FIG. 1, in addition to or instead of the distinct receipt printer 39, the printer assembly 37 may include the receipt printer directly as a part thereof, such as through a separate paper feed, printing directly on the card assembly 50, or requiring a conventional paper stock for the purposes of issuing a more traditional receipt before or after printing of the card assembly 50 and for completion of a desired transaction.

As indicated, the control processor 40 is structured to receive information relating at least to a payment authority from the transaction processor 30. In the case of a point of sale purchase of goods or services, the control processor 40 may only communicate an appropriate authorization to the transaction terminal to complete the point of sale purchase. In other embodiments, however, when an authorization code is desired for supporting another, typically subsequent transaction, the control processor 40 defines the user account. Along these lines, it is noted that when the control processor 40 defines a user account, a new user account may be provided in connection with each authorization code, or in some instances, an existing user account may be utilized, such as by re-filling. In either instance, however, each user account includes its defined value, whether the defined value begins at zero with the formation of a new user account or is at a defined amount already. The control processor 40 then adds to that defined value an amount defined at least by an authorized payment authority received from the transaction processor in connection with that user account. For example, if payments for point of sale purchases are not involved and a consumer's sole purpose is to obtain an appropriate authorization code for a new user account, or merely to add to an existing user account, a substantial component, if not all of the payment authority will usually be added to the value of the user account. In this regard, it is recognized that processing fees, service fees and the like many be deducted, such that a payment authority for a certain amount will not precisely correspond to the value added to the user account. Conversely, in connection with certain promotions, the value of the user account may be increased by an amount greater than the actual payment authority, such as in connection with an incentive plan where a payment authority of a certain larger amount entitles the consumer to a greater value increase to the user account (i.e. a $20 purchase gives $25 worth of credit).

Although a variety of different transactions may be achieved in connection with the issued authorization code, in one embodiment of the present invention the transaction that is facilitated by the authorization code includes a telephony communication. As a result, pre-paid service is established and an extent of the telephony communication(s) available is limited by the defined value of the user account associated with the authorization code. As mentioned, in such an embodiment a telephony access number is also provided to the user, such as on the card assembly 50, and may in include a toll-free or similar access number which initiates communication with a telephony server. With reference to FIG. 3, whether the telephony access number and or the authorization code are merely viewed on the display assembly 26 or are provided on the card assembly 50 by the printer assembly 37, a consumer utilizes the authorization code and telephony access number in connection with an auxiliary device 60, such as a computer or telephone, so as to communicate with a telephony server. The telephony server in turn communicates with the control processor 40, as at 42, of FIG. 3. Specifically, the auxiliary device 60 such as including the telephone and/or telephony server receives the authorization code and through communication with the control processor 40 is able to identify the user account and the defined value of the user account. Accordingly, the telephony server is able to determine the extent of the telephony communication that can be permitted and which has been paid for. Along these lines, it is recognized that the auxiliary device 60 including possibly the telephony server may be separate or part of the control processor 40, and if separate, may communicate with the control processor 40 in order to verify the validity of an authorization code in any manner. Therefore, a consumer, by purchasing the card assembly 50, is a giving the requisite authorization code 53 and telephony access number so as to obtain pre-paid telephony communication services, while also receiving the second portion 55 of the card assembly 50 which may include one or more different promotional items thereon. Moreover, a consumer is provided with incentive to purchase the particular card assembly 50 of the merchant over other more traditional calling cards that do not provide any added benefit to the consumer.

In yet another embodiment, and either instead of or in addition to the telephony communication, the transaction that is facilitated by the authorization code may include a lottery purchase. In particular, the control processor 40 may store a predefined quantity of lottery entries, such as in connection to an arrangement with a corresponding lottery commission, and preferably, but not necessarily pre-selected, random number lottery entries. As such, when an indication is made in connection with a payment authority that a lottery purchase is desired, the control processor 40 is able to issue at least one lottery entry 56 in response to the lottery purchase. In this regard it is recognized that the lottery entry 56 may be placed directly on the card assembly 50, such as on the second portion 55, or in some embodiments on the first portion of the card assembly 50 as the actual authorization code. Furthermore, if the control processor 40 is associated with an auxiliary device 60 such as a lottery printing device, the authorization code and/or one or more authorization code's may be provided to the user, either on the display assembly 26 or on the card assembly 50, for presenting in connection with the auxiliary device 60, thereby allowing the user to retrieve a more traditional lottery entry.

In yet another embodiment of the present multi-function transaction processing system 10, the transaction that is facilitated by the authorization code may include a purchase. Specifically, the purchase transaction may be facilitated either instead of or in addition to one or more other transactions such as the telephony communication. As such, it is recognized that one or more authorization code's may be provided to a consumer in connection with one or more payment authorities at the transaction terminal 20. In such an embodiment, the amount of the purchase that may be facilitated utilizing the authorization code is limited by the defined value of the user account associated with the authorization code. Additionally, a remote transaction processor may be provided, such as part of an auxiliary device 60, or integrated directly with the control processor 40. The remote transaction processor is structured to receive the authorization code from the user in connection with a purchase, and as an alternate means of payment for the purchase. For example, if a consumer desires to make an Internet purchase, the consumer will be able to communicate the authorization code to a participating merchant. In this regard, the authorization code provided by the consumer may authorize a specific defined amount corresponding the desired purchase or may authorize a number of purchases up to the defined value of the user account associated with the authorization code. As such, the control processor 40 is further structured to authorize the purchase in accordance with the authorization code and the associated account value without the need to provide access to personal information associated with the user making the purchase. Indeed, the user making the purchase is able to maintain a substantial degree of anonymity and security with regard to their credit card information, while still being able to achieve the desired purchase. Moreover, a consumer without access to credit is able to make a cash purchase over the internet or telephone by providing an appropriate payment to a merchant having a transaction terminal 20, and through the entry of an external payment verification, obtaining an authorization code that may be communicated in connection with the telephone or internet purchase.

The control processor 40 of the present invention is also preferably structured to maintain records of an activity of the transaction processor 30 and/or communications between the transaction processor 30 and the control processor 40. As a result, a merchant utilizing the transaction terminal is able to obtain records of payment authorities authorized and communicated to the control processor 40, and can identify the effectiveness of the transaction terminal 20 through its activity and through information relating to additional commercial transactions that are promoted by the transaction terminal 20. In this regard, it is recognized that either directly through the transaction terminal 20 or through other conventional means, such as a network interface, communication with the control processor 40 and/or its operators, such as by e-mail transactions and the like, can be achieved, thereby providing the user with substantial account and record keeping information and usage reports. Additionally, the transaction terminal 20 may be provided to a merchant in connection with a plurality of bundled services, such as personal long distance telephone access for use in the operation of the business, Internet access, electronic mail facilities, and the like, thereby providing an overall, beneficial package of services for the merchant.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A multi-function transaction processing system comprising:
   a) a transaction terminal, said transaction terminal including a data entry facility and a transaction processor;
   b) said transaction processor of said transaction terminal being communicatively associated with at least a control processor;
   c) said data entry facility including a payment authority input structured to accept a payment authority;
   d) said control processor structured to define a user account and to issue an authorization code associated with said user account at least in response to said payment authority;
   e) a printer assembly communicatively associated with said transaction terminal and structured to generate a card assembly;
   f) said card assembly including at least a first portion and a second portion, said first portion including at least said authorization code thereon;
   g) said second portion including promotional materials; and
   h) said user account including a defined value at least partially defined by said payment authority, said authorization code structured to facilitate a transaction in accordance with said defined value.

2. A multi-function transaction processing system as recited in claim 1 wherein said transaction that is facilitated by said authorization code includes a telephony communication, an extent of said telephony communication being limited by said defined value of said user account associated with said authorization code.

3. A multi-function transaction processing system as recited in claim 2 wherein said first portion of said card assembly further includes a telephony access number structured to be utilized to initiate said telephony communication with a telephony server.

4. A multi-function transaction processing system as recited in claim 1 wherein said card assembly is generally elongate, said first portion being detachable from said second portion.

5. A multi-function transaction processing system as recited in claim 4 wherein said first portion of said card assembly is structured to be substantially compact.

6. A multi-function transaction processing system as recited in claim 1 wherein said data entry facility includes a keypad.

7. A multi-function transaction processing system as recited in claim 1 wherein said data entry facility includes an electronic signature capture assembly.

8. A multi-function transaction processing system as recited in claim 1 wherein said payment authority input comprises a keypad structured to receive an input related to an external payment verification, said external payment verification at least partially comprising said payment authority.

9. A multi-function transaction processing system as recited in claim 8 wherein said transaction processor is structured to require an access authorization in connection with said external payment verification at least so as to ensure a validity of said external payment verification.

10. A multi-function transaction processing system as recited in claim 9 wherein said transaction processor is structured to communicate said payment authority to said control processor, said control processor structured to at least partially add a value associated with said payment authority to said defined value of said user account.

11. A multi-function transaction processing system as recited in claim 10 wherein said external payment verification is structured to identify a cash transaction.

12. A multi-function transaction processing system as recited in claim 10 wherein said external payment verification is structured to identify a credit transaction.

13. A multi-function transaction processing system as recited in claim 1 wherein said payment authority input is structured to receive credit card transaction information as said payment authority.

14. A multi-function transaction processing system as recited in claim 13 wherein said credit card transaction information includes at least a credit card account and a transaction amount.

15. A multi-function transaction processing system as recited in claim 14 wherein said transaction processor is structured to communicate said credit card transaction information to said control processor for authorization.

16. A multi-function transaction processing system as recited in claim 15 wherein said control processor is structured to at least partially add said transaction amount associated with said credit card transaction information to said defined value of said user account.

17. A multi-function transaction processing system as recited in claim 15 further comprising a receipt printer structured to print a receipt associated with an authorized transaction.

18. A multi-function transaction processing system as recited in claim 17 wherein said printer assembly includes said receipt printer.

19. A multi-function transaction processing system as recited in claim 17 wherein said receipt printer is at least partially distinct from said printer assembly.

20. A multi-function transaction processing system as recited in claim 13 wherein said payment authority input includes a magnetic stripe reader.

21. A multi-function transaction processing system as recited in claim 13 wherein said payment authority input device includes a keypad.

22. A multi-function transaction processing system as recited in claim 13 wherein said data entry facility includes an electronic signature capture assembly.

23. A multi-function transaction processing system as recited in claim 1 wherein said transaction that is facilitated by said authorization code includes a purchase, an amount of said purchase being limited by said defined value of said user account associated with said authorization code.

24. A multi-function transaction processing system as recited in claim 23 wherein said control processor is structured to authorize said purchase in accordance with said authorization code and said associated account value, thereby restricting access to information associated with a user making said purchase utilizing said authorization code.

25. A multi-function transaction processing system as recited in claim 24 further comprising a remote transaction processor, said remote transaction processor structured to receive said authorization code from said user and to communicate with said control processor so as validate said purchase.

26. A multi-function transaction processing system as recited in claim 1 wherein said transaction terminal further comprises a display screen.

27. A multi-function transaction processing system as recited in claim 1 wherein said transaction comprises a lottery purchase, said control processor structured to store a pre-defined quantity of lottery entries and to issue at least one of said lottery entries in response to said lottery purchase.

28. A multi-function transaction processing system as recited in claim 27 wherein said card assembly includes said lottery entry thereon.

29. A multi-function transaction processing system as recited in claim 1 wherein said control processor is structured to maintain records of an activity of said transaction processor, said activity of said transaction processor including at least a communication of said payment authority to said control processor.

30. A multi-function transaction processing system as recited in claim 1 wherein said control processor is structured to maintain records at least of communications between said transaction processor and said control processor.

31. A multi-function transaction processing system as recited in claim 1 wherein said card assembly is defined from a segment of generally stiff material, said printer assembly structured to receive said segment of generally stiff material therethrough.

32. A multi-function transaction processing system comprising:
   a. a transaction terminal, said transaction terminal including a data entry facility and a transaction processor;
   b. said transaction processor of said transaction terminal being communicatively associated with at least a control processor;
   c. said data entry facility including a payment authority input structured to accept a payment authority;
   d. said control processor structured to define a user account and to issue at least one authorization code associated with said user account at least in response to said payment authority;
   e. a printer assembly communicatively associated with said transaction terminal and structured to generate a card assembly;
   f. said card assembly including at least said authorization code thereon;
   g. said user account including a defined value at least partially defined by said payment authority, said authorization code structured to facilitate a telephony communication in accordance with said defined value; and
   h. said card assembly being generally elongate and further including promotional materials thereon, said promotional materials being at least partially detachable from a portion of said card assembly containing said authorization code.

33. A multi-function transaction processing system as recited in claim 32 wherein said card assembly further includes a telephony access number structured to be utilized to initiate said telephony communication with a telephony server.

34. A multi-function transaction processing system as recited in claim 32 wherein said data entry facility includes a keypad.

35. A multi-function transaction processing system as recited in claim 32 wherein said data entry facility includes an electronic signature capture assembly.

36. A multi-function transaction processing system as recited in claim 32 wherein said payment authority input is structured to receive an input related to an external payment verification, said external payment verification at least partially comprising said payment authority.

37. A multi-function transaction processing system as recited in claim 36 wherein said transaction processor is structured to communicate said payment authority to said control processor, said control processor structured to at least partially add a value associated with said payment authority to said defined value of said user account.

38. A multi-function transaction processing system as recited in claim 32 wherein said payment authority input is structured to receive credit card transaction information as said payment authority.

39. A multi-function transaction processing system as recited in claim 38 wherein said control processor is structured to at least partially add a transaction amount associated with said credit card transaction information to said defined value of said user account.

40. A multi-function transaction processing system as recited in claim 39 further comprising a receipt printer structured to print a receipt associated with an authorized transaction.

41. A multi-function transaction processing system as recited in claim 38 wherein said payment authority input includes a magnetic stripe reader.

42. A multi-function transaction processing system as recited in claim 38 wherein said data entry facility includes an electronic signature capture assembly.

43. A multi-function transaction processing system as recited in claim 32 wherein a further transaction that is facilitated by said authorization code includes a purchase, an amount of said purchase being limited by said defined value of said user account associated with said authorization code.

44. A multi-function transaction processing system as recited in claim 43 wherein said control processor is structured to authorize said purchase in accordance with said authorization code and said associated account value, thereby restricting access to information associated with a user making said purchase utilizing said authorization code.

45. A multi-function transaction processing system as recited in claim 32 wherein said transaction comprises a lottery purchase, said control processor structured to store a pre-defined quantity of lottery entries and to issue at least one of said lottery entries in response to said lottery purchase.

46. A multi-function transaction processing system as recited in claim 32 wherein said control processor is structured to maintain records of an activity of said transaction processor, said activity of said transaction processor including at least a communication of said payment authority to said control processor.

47. A multi-function transaction processing system comprising:
   a. a transaction terminal, said transaction terminal including a data entry facility and a transaction processor;
   b. said transaction processor of said transaction terminal being communicatively associated with at least a control processor;
   c. said data entry facility including a payment authority input structured to accept a payment authority;
   d. said control processor structured to define a user account and to issue at least one authorization code associated with said user account at least in response to said payment authority;
   e. said user account including a defined value at least partially defined by said payment authority; and
   f. said authorization code structured to be provided to a merchant in connection with a purchase, an amount of said purchase being limited by said defined value of said user account associated with said authorization code.

48. A multi-function transaction processing system as recited in claim 47 wherein said control processor is structured to authorize said purchase in accordance with said authorization code and said associated account value, thereby restricting access to information associated with a user making said purchase utilizing said authorization code.

49. A multi-function transaction processing system as recited in claim 48 further comprising a remote transaction processor associated with the merchant, said remote transaction processor structured to receive said authorization code from said user and to communicate with said control processor so as validate said purchase.

50. A multi-function transaction processing system as recited in claim 47 further comprising a printer assembly communicatively associated with said transaction terminal and structured to generate a card assembly including at least said authorization code thereon.

51. A multi-function transaction processing system as recited in claim 47 wherein said payment authority input is structured to receive an input related to an external payment verification, said external payment verification at least partially comprising said payment authority.

52. A multi-function transaction processing system as recited in claim 47 wherein said payment authority input is structured to receive credit card transaction information as said payment authority.

53. A multi-function transaction processing system as recited in claim 52 wherein said control processor is structured to at least partially add a transaction amount associated with said credit card transaction information to said defined value of said user account.

\* \* \* \* \*

(12) EX PARTE REEXAMINATION CERTIFICATE (6386th)
United States Patent
Arias

(10) Number: US 6,651,885 C1
(45) Certificate Issued: Aug. 19, 2008

(54) MULTI-FUNCTION TRANSACTION PROCESSING SYSTEM

(75) Inventor: Luis A. Arias, Miami, FL (US)

(73) Assignee: Blackstone Corporation, Miami, FL (US)

Reexamination Request:
No. 90/007,958, Mar. 3, 2006

Reexamination Certificate for:
Patent No.: 6,651,885
Issued: Nov. 25, 2003
Appl. No.: 09/588,917
Filed: Jun. 8, 2000

(51) Int. Cl.
*G06F 7/08* (2006.01)

(52) U.S. Cl. .......................... 235/381; 235/383; 705/1; 705/16; 705/44; 700/233; 700/231

(58) Field of Classification Search .................. None
See application file for complete search history.

(56) References Cited

U.S. PATENT DOCUMENTS

| | | |
|---|---|---|
| 4,359,631 A | 11/1982 | Lockwood et al. |
| 4,399,510 A | 8/1983 | Hicks |
| 4,567,359 A | 1/1986 | Lockwood |
| 4,783,064 A | 11/1988 | Hayashi |
| 4,818,854 A | 4/1989 | Davies et al. |
| 4,872,660 A | 10/1989 | Kameyama et al. |
| 4,877,947 A | 10/1989 | Mori |
| 4,908,761 A | 3/1990 | Tai |
| 4,951,308 A | 8/1990 | Bishop et al. |
| 5,076,562 A | 12/1991 | Sai et al. |
| 5,145,160 A | 9/1992 | Nagashima et al. |
| 5,146,067 A | 9/1992 | Sloan et al. |
| 5,156,385 A | 10/1992 | Muto et al. |
| 5,243,174 A | 9/1993 | Veeneman et al. |
| 5,250,789 A | 10/1993 | Johnsen |
| 5,285,382 A | 2/1994 | Muehlberger et al. |
| 5,299,796 A | 4/1994 | Wooldridge |
| 5,513,117 A | 4/1996 | Small |
| 5,557,518 A | 9/1996 | Rosen |
| 5,577,109 A | 11/1996 | Stimson et al. |
| 5,578,808 A | 11/1996 | Taylor |
| 5,621,787 A | 4/1997 | McKoy et al. |
| 5,627,356 A | 5/1997 | Takemoto et al. |
| 5,637,845 A | 6/1997 | Kolls |
| 5,673,309 A | 9/1997 | Woynoski et al. |
| 5,681,787 A | 10/1997 | Seamans et al. |
| 5,684,291 A | 11/1997 | Taskett |
| 5,687,087 A | 11/1997 | Taggart |

(Continued)

FOREIGN PATENT DOCUMENTS

| | | |
|---|---|---|
| EP | 0 406 841 A1 | 1/1991 |
| EP | 0 527 639 A2 | 2/1993 |
| EP | 0627714 | 12/1994 |

(Continued)

OTHER PUBLICATIONS

U.S. District Court—S.D of Florida (Miami), Civil Docket for Case No. 03–CV–23400, *Exigent Technology v. Prepaid Network, et al.* (Dated Aug. 8, 2006 / Miami, FL).

(Continued)

*Primary Examiner*—Beverly M. Flanagan

(57) ABSTRACT

A multi-function transaction processing system including a transaction terminal having a data entry facility and a transaction processor, the transaction processor being communicatively associated with a control processor that defines user accounts and issues one or more authorization codes associated with the user account(s) in response to payment authorities provided at the transaction terminal utilizing a payment authority input of the data entry facility. Furthermore, a printer assembly is communicatively associated with the transaction terminal and generates a card assembly, the card assembly including a first portion containing the authorization code thereon, and a second portion including additional promotional materials thereon. The user account as defined by the control assembly, includes a defined value, the authorization code provided being utilized to facilitate a transaction in accordance with that defined value.

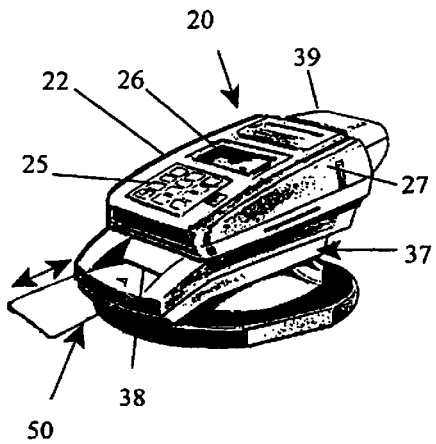

U.S. PATENT DOCUMENTS

| | | | |
|---|---|---|---|
| 5,696,908 | A | 12/1997 | Muehlberger et al. |
| 5,721,768 | A | 2/1998 | Stimson et al. |
| 5,722,067 | A | 2/1998 | Fougnies et al. |
| 5,778,313 | A | 7/1998 | Fougnies |
| 5,828,740 | A | 10/1998 | Khuc et al. |
| 5,845,259 | A | 12/1998 | West et al. |
| 5,854,975 | A | 12/1998 | Fougnies et al. |
| 5,868,236 | A | 2/1999 | Rademacher |
| 5,884,292 | A | 3/1999 | Baker et al. |
| 5,892,827 | A | 4/1999 | Beach et al. |
| 5,903,633 | A | 5/1999 | Lorsch |
| 5,970,469 | A | 10/1999 | Scroggie et al. |
| 5,980,011 | A | 11/1999 | Cummins et al. |
| 5,988,509 | A | 11/1999 | Taskett |
| 5,991,380 | A | 11/1999 | Bruno et al. |
| 5,991,749 | A | 11/1999 | Morrill, Jr. |
| 5,999,914 | A | 12/1999 | Blinn et al. |
| 6,032,859 | A | 3/2000 | Muehlberger et al. |
| 6,035,025 | A | 3/2000 | Hanson |
| 6,050,493 | A | 4/2000 | Fertig |
| 6,081,791 | A | 6/2000 | Clark |
| 6,105,009 | A | 8/2000 | Cuervo |
| 6,149,055 | A | 11/2000 | Gatto |
| 6,152,029 | A | 11/2000 | Templeton |
| 6,155,487 | A | 12/2000 | Dean et al. |
| 6,169,975 | B1 | 1/2001 | White et al. |
| 6,269,343 | B1 | 7/2001 | Pallakoff |
| 6,308,887 | B1 | 10/2001 | Korman et al. |
| 6,318,536 | B1 | 11/2001 | Korman et al. |
| 6,402,039 | B1 | 6/2002 | Freeman et al. |
| 6,405,182 | B1 | 6/2002 | Cuervo |
| 6,431,537 | B1 | 8/2002 | Meier |
| 6,457,886 | B1 | 10/2002 | Meier |
| 6,513,710 | B1 | 2/2003 | Haas |
| 6,526,130 | B1 | 2/2003 | Paschini |
| 6,575,361 | B1 | 6/2003 | Graves et al. |
| 6,659,259 | B2 | 12/2003 | Knox et al. |
| 6,688,740 | B2 | 2/2004 | Driggers |
| 2001/0023415 | A1 | 9/2001 | Keil |
| 2002/0121545 | A1 | 9/2002 | Eguchi et al. |
| 2002/0165820 | A1 | 11/2002 | Anvekar et al. |
| 2003/0106934 | A1 | 6/2003 | McCall et al. |
| 2003/0163425 | A1 | 8/2003 | Cannon, Jr. |
| 2004/0122753 | A1 | 6/2004 | Yap et al. |

FOREIGN PATENT DOCUMENTS

| | | |
|---|---|---|
| FR | 2 779 381 A1 | 12/1999 |
| GB | 2 338 814 A | 12/1999 |
| JP | 01261799 A | 10/1989 |
| JP | 11134539 A | 5/1999 |
| JP | 2000099811 A | 4/2000 |
| KR | 2001074614 A | 8/2001 |
| WO | WO 95/12169 | 5/1995 |
| WO | WO96/33801 | 12/1996 |
| WO | WO96/41462 | 12/1996 |
| WO | WO97/30409 | 8/1997 |
| WO | WO98/47112 | 10/1998 |
| WO | WO 98/47116 | 10/1998 |
| WO | WO 99/23622 | 5/1999 |
| WO | WO99/25106 | 5/1999 |
| WO | WO99/62038 | 12/1999 |
| WO | WO 00/79492 A1 | 12/2000 |
| WO | WO 01/43095 A2 | 6/2001 |
| WO | WO 01/91070 A3 | 11/2001 |
| WO | WO 01/95264 A2 | 12/2001 |

OTHER PUBLICATIONS

Complaint [Case No. 03–CV–23400 / Filed Dec. 24, 2003/ Miami, FL].

Defendants', Prepaid Network Corp and Johnny Morales, Answer, Affirmative Defenses and Counterclaims [Case No. 03–CV–23400 / Filed Aug. 2, 2004 Miami, FL].

Plaintiff's Denial of Defendants' . . . Affirmative Defenses & Answer to Counterclaims [Case No. 03–CV–23400 / Filed Aug. 20, 2004/ Miami, FL].

Memorandum of Law in Support of Motions by the Defendants . . . for Judicial Notice and Summary Judgment [Case No. 03–CV–23400 / Served Jan. 31, 2005 / Miami, FL].

Motion For Summary Judgment by the Defendants Prepaid Network, Corp. and Johnny Morales [Case No. 03–CV–23400 / Filed Jan. 31, 2005 / Miami, FL].

Notice of Filing Plaintiff's Expert Report [Case No. 03–CV–23400 / Served Feb. 14, 2005 / Miami, FL].

Plaintiff's Opening Markman Brief [Case No. 03–CV–23400 / Filed Feb. 22, 2005 / Miami, FL].

Amended Motion for Summary Judgment by the Defendants Prepaid Network, Corp. and Johhny Morales [Case No. 03–CV–23400 / Filed Mar. 3, 2005 / Miami, FL].

Rebuttle to the Plaintiff's Markman Brief by the Defendants Prepaid Network, Corp. and Johhny Morales [Case No. 03–CV–23400 / Filed Mar. 4, 2005 / Miami, FL].

Amended Motion for Summary Judgment by the Defendants Prepaid Network, Corp. and Johhny Morales [Case No. 03–CV–23400 / Filed Mar. 11, 2005 / Miami, FL].

Second Amended Motion for Summary Judgment by the Defendants Prepaid Network, Corp. and Johhny Morales [Case No. 03–CV–23400 / Filed Mar. 11, 2005 / Miami, FL].

Affidavit in Support of Defendants's Motion for Summary Judgment [Case No. 03–CV–23400 / Filed Mar. 11, 2005 / Miami, FL].

Plaintiff's Motion to Strike Defendants' Rebuttal to the Plaintiff's Markman Brief [Case No. 03–CV–23400 / Filed Mar. 17, 2005 / Miami, FL].

P's Opposition to D's 4th Motion for Summary Judgment & Request for Attorneys Fees . . . for Ds' Discovery Violations [Case No. 03–CV–23400 / Filed Mar. 21, 2005 / Miami, FL].

Reply in Support of Defendants' Second Amended Motion for Summary Judgment [Case No. 03–CV–23400 / Filed Mar. 25, 2005 / Miami, FL].

Response to Plaintiff's Motion to Strike Defendants' Rebuttal to the Plaintiff's Markman Brief [Case No. 03–CV–23400 / Served Mar. 30, 2005 / Miami, FL].

Plaintiff's Memorandum of Law in Opposition to Defendants' Motion for a Protective Order [Case No. 03–CV–23400 / Filed Apr. 1, 2005 / Miami, FL].

Joint Pretrial Stipulation [Case No. 03–CV–23400 / Served Apr. 4, 2005 / Miami, FL].

Defendants' Motion for a Daubert Hearing Regarding Plaintiff's Expert Witness,, Martin M. Zoltick . . . [Case No. 03–CV–23400 / Served Apr. 7, 2005 / Miami, FL].

Plaintiff's Reply Memorandum in Support of its Motion to Strike Defendants' Rebuttal to Plaintiff's Markman Brief [Case No. 03–CV–23400 / Served Apr. 8, 2005 / Miami, FL].

Defendants', Prepaid and Morales, Proposed Findings of Fact and Conculstions of Law [Case No. 03–CV–23400 / Filed Apr. 11, 2005 / Miami, FL].

Plaintiff's Opposition to Defendants' Motion for a Daubert Hearing Regarding Plaintiff's Expert Witness Martin Zoltick [Case No. 03–CV–23400 / Filed Apr. 22, 2005 / Miami, FL].

P's Motion In Limine & Inc'd Memo . . . to Exclude Exhibits & Witnesses . . . & . . . Other Inadmissible Evidence [Case No. 03–CV–23400 / Filed Apr. 26, 2005 / Miami, FL].
Reply in Support of Defendants' Motion for a Daubert Hearing Regarding Plaintiff's Expert Witness Martin Zoltick [Case No. 03–CV–23400 /Filed May 2, 2005 / Miami, FL].
Defendants' Response to Plaintiff's Motion in Limine [Case No. 03–CV–23400 / Served May 13, 2005 / Miami, FL].
Plaintiff's Notice to Defendant to Produce at Hearing [Case No. 03–CV–23400 / Filed Jul. 6, 2005 / Miami, FL].
U.S. District Court—S.D. of Florida (Miami), Civil Docket for Case No. 04–CV–20415, *Exigent Technology et al* v. *Family Dollar Stores et al.* (Dated Aug. 8, 2006 / Miami, FL).
Complaint [Case No. 04–CV–20415 / Filed Feb. 20, 2004 / Miami, FL].
Order On Defendants' Motion To Transfer [Case No. 04–CV–20415 / Aug. 27, 2004 / Miami, FL].
U.S. District Court—S.D. of Florida (Miami), Civil Docket for Case No. 04–CV–20484, *Exigent Technology* v. *Atrana Solutions* (Dated Aug. 8, 2006 / Miami, FL).
Complaint [Case No. 04–CV–20484 / Filed Mar. 2, 2004 / Miami, FL].
Defendant's, Atrana Solutions, Inc., Answer, Affirmative Defenses and Counterclaims to Plaintiff's Complaint [Case No. 04–CV–20484 / Served May 28, 2004 / Miami, FL].
Defendants' Rule 26 (a) (1) Initial Disclosures [Case No. 04–CV–20484 / Filed Jun. 21, 2004 / Miami, FL].
Plaintiffs Answer To Defendant's Counterclaim [Case No. 04–CV–20484 / Served Jun. 28, 2004 / Miami, FL].
Markman Brief [Case No. 04–CV–20484 / Filed Aug. 27, 2004 / Miami, FL].
Plaintiff Exigent Technology, Inc.'s Markman Brief on Claim Construction [Case No. 04–CV–20484 / Served Aug. 27, 2004 / Miami, FL].
Transcript of Markman Hearing Before the Honorable Marcia G. Cooke . . . (Note: pp. 2, 5 & 8–11 missing from document) [Case No. 04–CV–20484 / Dated Aug. 30, 2004 / Miami, FL].
Supplementary Brief Of Plaintiff [Case No. 04–CV–20484 / Filed Sep. 1, 2004 / Miami, FL].
Defendant's Reply to the Supplementary Brief of Plaintiff [Case No. 04–CV–20484 / Served Sep. 8, 2004 / Miami, FL].
Defendant's Motion To Strike Certain Statements From the Supplementary Brief of Plaintiff [Case No. 04–CV–20484 / Served Sep. 8, 2004 / Miami, FL].
Plaintiff's Reply to Defendant's Motion to Strike Certain Statements From the Supplementary Brief of Plaintiff [Case No. 04–CV–20484 / Served Sep. 17, 2004 / Miami, FL].
Defendant's Motion for Summary Judgment and Supporting Memorandum of Law [Case No. 04–CV–20484 / Filed Sep. 24, 2004 / Miami, FL].
Plaintiff's Response to Defendant's Reply to the Supplementary [Markman] Brief of Plaintiff [Case No. 04–CV–20484 / Filed Sep. 27, 2004 / Miami, FL].
Defendant's Motion to Strike Plaintiff's Response to Defendant's Reply to the Supplementary Brief of Plaintiff [Case No. 04–CV–20484 / Served Oct. 7, 2004 / Miami, FL].
Expert Report of Enrique Lopez [Case No. 04–CV–20484 / Filed Oct. 8, 2004 / Miami, FL].
Defendant's Mediator Summary [Case No. 04–CV–20484 / Served Nov. 1, 2004 / Miami, FL].
Amended Order Granting D's Motion for Summary Judgment and Denying all Pending Motion as Moot [Case No. 04–CV–20484 / Filed Nov. 29, 2004 / Miami, FL].
Atrana's Memorandum of Law in Opposition to P's Motion to Vacate Summary Judgment & Enforce Settlement Agreement [Case No. 04–CV–2–484 / Filed Apr. 19, 2006 / Miami, FL ].
P's Notice of Filing Support for Motion to Enforce S. A., Vacate Order Granting Sum Judgment (D. E.89) & to Dismiss Case Case No. 04–CV–20484 / Filed Apr. 19, 2006 / Miami, FL.
Order [Case No. 04–CV–20484 / Filed Apr. 27, 2006 / Miami, FL].
Final Judgment [Case No. 04–CV–20484 / Filed May 22, 2006 / Miami, FL].
Amended Notice of Appeal [Case No. 04–CV–20484 / Dated May 24, 2006 / Miami, FL].
U.S. District Court—S.D. of Florida (Miami), Civil Docket for Case No. 04–CV–22140, *Exigent Technology* v. *Radiant Telecom, Inc., et al.* (Dated Aug. 8, 2006 / Miami, FL).
Complaint [Case No. 04–CV–22140 / Filed Aug. 25, 2004 / Miami, FL].
Answer, Affirmative Defenses & Counterclaims by Ds Radiant Telecom, Inc., Iprepay, Inc., and Ntera Holdings, Inc. [Case No. 04–CV–22140 / Filed Oct. 2, 2004 / Miami, FL].
Plaintiff's Answer to Counterclaims of Radiant Telecom, Inc., IPrepay, Inc., and Ntera Holdings, Inc. [Case No. 04–CV–22140 / Filed Oct. 25, 2004 / Miami, FL].
First Amended Complaint [Case No. 04–CV–22140 / Filed Nov. 5, 2004 / Miami, FL].
Answer & Affirmative Defenses to Amended Complaint, Counterclaims by Ds Radiant Telecom, Inc., et al. [Case No. 04/CV–22140 / Served Dec. 1, 2004 / Miami, FL].
Plaintiff's Answer and Affirmative Defenses to Defendants' Counterclaims [Case No. 04–CV–22140 / Dec. 28, 2004 / Miami, FL].
Defendant Iprepay's First Motion for Leave to Amend its Answer, ff. Defenses & Counterclaims; Incorporated Memo. of Law [Case No. 04–CV–22140 Filed Apr. 4, 2005 / Miami, FL].
Answer and Affirmative Defenses to Amended Complaint, and Amended Counterclaims by Defendant Iprepay, Inc. [Case No. 04–CV–22140 / Filed Apr. 4, 2005 / Miami, FL].
P's Opposition to Defendant Iprepray's First Motion for Leave to Amend its Answer, Affirmative Defenses & Counterclaims [Case No. 04–CV–22140 / Filed Apr. 21, 2005 / Miami, FL].
Defendant Iprepay's Reply to P's Opposition to 1st Motion . . . to Amend its Answer, Affirmative Defenses & Counterclaims [Case No. 04–CV–22140 / Filed May 4, 2005 / Miami, FL].
Counterclaim Defendants' Answer and Affirmative Defenses to Defendant Iprepray, Inc.'s Amended Counterclaims [Case No. 04–CV–22140 / Filed May 31, 2005 / Miami, FL].
Answer and Affirmative Defenses of Defendant Johnny Rodriguez [Case No. 04–CV–22140 / Filed Jun. 27, 2005 / Miami, FL].
Plaintiff's Opening Markman Brief [Case No. 04–CV–22140 / Filed Jul. 14, 2005 / Miami, FL].
Second Amended Complaint [Case No. 04–CV–22140 / Served Jul. 25, 2005 / Miami, FL].

Ds' . . . Brief in Support of Ds' Markman Claim Construction [Case No. 04–CV–22140 / Filed Aug. 3, 2005 / Miami, FL].
Declaration of Richard Eskew in Support of Defendants Brief in Support of Defendants' Markman Claim Construction [Case No. 04–CV0–22140 / Filed Aug. 3, 2005 / Miami, FL].
Third Amended Complaint [Case No. 04–CV–22140 / Filed Aug. 19, 2005 / Miami, FL].
Plaintiff's Reply Memorandum in Support of its Motion for a 30–Day Extension of Time To Disclose a Technical Expert [Case No. 04–CV–22140 / filed Aug. 29, 2005 / Miami, FL].
Defendant Rodriguez's Notice of Joining Defendants . . . Brief in Support of Defendants' Markman Claim Construction [Case No. 04–CV–22140 / Entered Aug. 31, 2005 / Miami, FL].
Plaintiff's Motion for Consolidation of this Action With Civil Action No. 05–CV–22411 [Case No. 04–CV–22140 / Filed Sep. 12, 2005 / Miami, FL].
Joint Markman Hearing Memorandum [Case No. 04–CV–22140 / Filed Oct. 3, 2005 / Miami, FL].
Order Granting Plaintiff's Motion to Consolidate . . . and Instructing Clerk of Court to Consolidate Action [Case No. 04–CV–22140 / Filed Oct. 7, 2005 / Miami, FL].
Answer and Affirmative Defenses to Complaint, Counterclaims by Defendants . . . [Case No. 04–CV–22140 / Filed Oct. 12, 2005 / Miami, FL].
Markman Hearing Transcript [Case No. 04–CV–22140 / Filed Oct. 14, 2005 / Miami, FL].
Parties' Stipulation of Claim Construction of Certain Terms of U.S. Patent No. 6,651,885 [Case No. 04–CV–22140 / Entered Oct. 19, 2005 / Miami, FL].
Supplemental Claim Construction Brief [Case No. 04–CV–22140 / Filed Oct. 20, 2005 / Miami, FL].
Plaintiff's Supplemental Markman Brief [Case No. 04–CV–22140 / Filed Oct. 20, 2005 / Miami, FL].
Claim Chart Comparison [Case No. 04–CV–22140 / Filed Oct. 21, 2005 / Miami, FL].
Plaintiff's Notice of Filing Amended Joint Claim Construction Statement . . . [Case No. 04–CV–22140 / Filed Nov. 9, 2005 / Miami, FL].
Markman Hearing (Continued) Transcript [Case No. 04–CV–22140 / Filed Nov. 15, 2005 / Miami, FL].
Fourth Amended Complaint [Case No. 04–CV–22140 / Served Dec. 16, 2005 / Miami, FL].
Counterclaim Defendant Michael Acton's Answer and Affirmative Defenses to Defendant's Counterclaims [Case No. 04–CV–22140 / Filed Dec. 28, 2005 / Miami, FL].
Counterclaim Defendant Luis Arias' Answer and Affirmative Defenses to Defendant's Counterclaims [Case No. 04–CV–22140 / Filed Dec. 28, 2005 / Miami, FL].
Answer, Affirmative Defenses, and Counterclaims by Ds and Third–Party Complaint by Third Party Ps [Case No. 04–CV022140 / Filed Jan. 5, 2006 / Miami, FL].
Answer and Affirmative Defenses by Counterclaim Defendant Exigent & Third Party Ds Blackstone Entities, Arias and Acton [Case No. 04–CV–22140 / Filed Jan. 31, 2006 / Miami, FL].
Defendants' Statement Regarding Draft Claim Construction [Case No. 04–CV–22140 / Filed Feb. 3, 2006 / Miami, FL].
Plaintiff's Response to the Court's Draft Claim Construction [Case No. 04–CV–22140 / Filed Feb. 3, 2006 / Miami, FL].
Defendants' Supplemental Statement Regarding Draft Claim Construction [Case No. 04–CV–22140 / Filed Feb. 22, 2006 / Miami, FL].
Plaintiff's Response to Defendants' Statement Regarding Draft Claim Construction [Case No. 04–CV–22140 / Served Feb. 22, 2006 / Miami, FL].
Defendants' Response to Plaintiffs Motion to Strike the Supplemental Expert Report of Jose Fortes [Case No. 04–CV–22140 / Filed Mar. 6, 2006 / Miami, FL].
Claims Construction Order [Case No. 04–CV–22140 / Filed Mar. 15, 2006 / Miami, FL].
Plaintiff's Reply in Support of its Motion to Strike the Supplemental Expert Report of Jose Fortes [Case No. 04–CV–22140 / Filed Mar. 16, 2006 / Miami, FL].
Ds' Notice of Filing Copy of Request for Rexamination of the '885 Patent Filed with the U.S. PTO [Case No. 04–CV–22140 / Filed Mar. 23, 2006 / Miami, FL].
Ds' Motion for Recon. of the Ct's Claim Construction Order in View of Fed.Cir. Decision & Motion for Clarification [Case No. 04–CV–22140 / Filed Mar. 27, 2006 / Miami, FL].
Defendants' Motion to Exclude Expert Testimony of John Cosgrove [Case No. 04–CV–22140 / Filed Mar. 27, 2006 / Miami, FL].
Plaintiff's Motion to Preclude the Expert Testimony and Reports of Dr. Jose Fortes [Case No. 04–CV–22140 / Filed Mar. 27, 2006 / Miami, FL].
D Radiant's Motion for Sum. Judgment of Invalidity (§102—Printed Publications) & Incorporated Memo of Law [Case No. 04–CV–22140 / Filed Apr. 6, 2006 / Miami, FL].
Ds Netel's Motion for Summary Judgment of Unenforceability and Non–Infringement and Incorporated Memorandum of Law [Case No. 04–CV–22140 / Filed Apr. 6, 2006 / Miami, FL].
Defendant Iprepay, Inc.'s Motion for Summary Judgment of Non–infringement and Incorporated Memorandum of Law [Case No. 04–CV–22140 / Filed Apr. 6, 2006 / Miami, FL].
D Ntera's Motion for Summary Judgment of Invalidity (§102—Commercial Systems) & Incorporated Memo of Law [Case No. 04–CV–22140 / Filed Apr. 6, 2006 / Miami, FL].
Ds Intelligent's & Ntera's Motion for Summary Judgment of Non–Infringement & Incorporated Memorandum of Law [Case No. 04–CV–22140 / Filed Apr. 6, 2006 / Miami, FL].
Ds Numind's Motion for Summary Judgment of Non–Infringement & Invalidity (§112) & Incorporated Memorandum of Law [Case No. 04–CV–22140 / Filed Apr. 6, 2006 / Miami, FL].
Ps' Motion & Memorandum in Support Thereof for Summary Judgment on Infringment, Invalidity & Unenforceability [Case No. 04–CV–22140 / Filed Apr. 7, 2006 / Miami, FL].
Notice of Filing [Case No. 04–CV–22140 / Filed Apr. 7, 2006 / Miami, FL].
Counterclaim Ds' Motion & Memo of Law in Support for Sum. Judg'mt on the counterclaims [Case No. 04–CV–22140 / Filed Apr. 7, 2006 / Miami, FL].
P's Motion to Strike & Opposition to Ds' Motion for Recon. & Clarification of the Ct's Claim Construction Order [Case No. 04–CV–22140 / Filed Apr. 11, 2006 / Miami, FL].
Defendants' Opposition to Preclude the Expert Testimony and Reports of Dr. Jose Fortes [Case No. 04–CV–22140 / Filed Apr. 13, 2006 / Miami, FL].

Plaintiff's Opposition to Defendants' Motion to Exclude Expert Testimony of John Cosgrove [Case No. 04–CV–22140 / Filed Apr. 13, 2006 / Miami, FL].

Plaintiff's Opposition to Defendants' Motion to Exclude Expert Testimony of Martin M. Zoltick [Case No. 04–CV–22140 / Filed Apr. 13, 2006 / Miami, FL].

Notice of Filing [Case No. 04–CV–22140 / Filed Apr. 13, 2006 / Miami, FL].

Ds' Opposition to P's Motion & Memo in Support thereof for Sum. Judg'nt of Infringement, Invalidity & Unenforceability [Case No. 04–CV–22140 / Filed Apr. 21, 2006 / Miami, FL].

Iprepay's Opposition to Counterclaim Defendants' Motion for Summary Judgment on Counterclaims [Case No. 04–CV–22140 / Filed Apr. 21, 2006 / Miami, FL].

Ds' Opp. to P's Motion to Strike & Reply to P's Opp. to Motion for Recon. & Clarification of Ct's Claim Construct Order [Case No. 04–CV–22140 / Filed Apr. 21, 2006 / Miami, FL].

Plaintiff's Opposition to Defendants, Iss, LLC and Ntera, Inc.'s Motion for Summary Judgment [Case No. 04–CV–22140 / Filed Apr. 21, 2006 / Miami, FL].

Plaintiff's Opposition to Netel, Inc.'s Motion for Summary Judgment on Unenforceability and Non–Infringement [Case No. 04–CV–22140 / Filed Apr. 21, 2006 / Miami, FL].

Plaintiff's Opposition to Defendant, Iprepay, Inc's Motion for Summary Judgment [Case No. 04–CV–22140 / filed Apr. 21, 2006 / Miammi, FL].

Plaintiff's Reply in Support if its Motion to Preclude the Expert Testimony and Reports of Dr. Jose Fortes [Case No. 04–CV–22140 / Filed Apr. 21, 2006 / Miami, FL].

P's Opposition to Radiant's Motion for Summary Judgment of Invalidity Based Upon Anticipation Due to Prior Printed Art [Case No. 04–CV–22140 / Filed Apr. 21, 2006 / Miami, FL].

P's Opposition to Ntera's Motion Sum. Judg'mt of Invalidity Based Upon Anticipation Due to Prior Art Commercial Systems [Case No. 04–CV–22140 / Filed Apr. 21, 2006 / Miami, FL].

P's Opposition to Numind Software Systems, Inc.'s Motion for Summary Judgment on Non–Infringement and Invalidity [Case No. 04–CV–22140 / Filed Apr. 21, 2006 / Miami, FL].

Defendants' Reply to Plaintiff's Opposition to Defendants' Motion to Exclude Expert Testimony of John Cosgrove [Case No. 04–CV–22140 / Filed Apr. 24, 2006 / Miami, FL].

Defendants' Reply to Plaintiff's Opposition to Defendants' Motion to Exclude Expert Testimony of Martin M. Zoltick, Esq [Case No. 04–CV–22140 / Filed Apr. 24, 2006 / Miami, FL].

Defendants' Agreed Motion to Stay Litigation Pending Reexamination of the '885 Patent by the United States Patent Office[Case No. 04–CV–22140 / Filed Apr. 27, 2006 / Miami, FL].

Defendant Iprepay's Reply to Plaintiff's Opposition to Defendants' Motion for Summary Judgment of Non–Infringement [Case No. 04–CV–22140 / Filed May 1, 2006 / Miami, FL].

Reply to Plaintiff's Opposition to Defendant Netel's Motion for Summary Judgment of Unenforceability and Non–infrigement [Case No. 04–CV–22140 / Filed May 1, 2006 / Miami, FL].

D Ntera's Reply to P's Opp. to Motion for Sum. Judg'mt of Invalidity Based Upon Anticipation Due to Prior Art Com System [Case No. 04–CV–22140 / Filed May 1, 2006 / Miami, FL].

D Radiant's Reply to P's Opposition to Motion for Sum Judgment of Invalidity Based Anticipation Due to Printed Prior Art [Case No. 04–CV–22140 / Filed May 1 2006 / Miami, FL].

D Numind's Reply to P's Opposition to Motion for Summary Judgment on Non–Infringement & Invalidity (§112) [Case No. 04–CV–22140 / Filed May 1, 2006 / Miami, FL].

Defendants' Reply to Plaintiff's Opposition to Defendants' Motion for Summary Judgment of Non–Infringement [Case No. 04–CV–22140 / filed May 1, 2006 / Miami, FL].

Plaintiff's Reply in Support of its Motion for Summary Judgment on Infringement [Case No. 04–CV–22140 / Filed May 1, 2006 / Miami, FL].

Counterclaim Defendants' Reply in Support of Their Motion for Summary Judgment [Case No. 04–CV–22140 / Filed May 1, 2006 / Miami, FL].

Order Staying Litigation Pending Patent Reexamination and Denying Motions for Summary Judgment Without Prejudice [Case No. 04–CV–22140 / Filed May 2, 2006 / Miami, FL].

U.S. District Court—N.D. of Georgia (Atlanta), Civil Docket for Case No. 1:04–CV–00873–RLV, *Pre Solutions, Inc. et al.* v. *Exigent USA, Inc.* (Dated Aug. 8, 2006 / Atlanta, GA).

Complaint for Declaratory Judgment [Case No. 1:04–cv–00873–RLV / Filed Mar. 30, 2004 / Atlanta, GA].

Order [Case No. 1:04–cv–00873–RLV / Filed Jul. 11, 2005 / Atlanta, GA].

U.S. District Court—N.D. of Georgia (Atlanta), Civil Docket for Case No. 1:04–cv–02693–RLV, *Exigent USA, Inc.* v. *Presolutions, Inc. et al.* (Dated Aug. 8, 2006 / Atlanta, GA).

Complaint [Case No. 1:04–cv–02693–RLV / Filed Sep. 14, 2004 / Atlanta, GA](Note: Complaint Originally filed Feb. 20, 2004 / Case No. 04–CV–20415 / U.S. D.C. for S.D. Fla).

Defendant's Answer, Affirmative Defenses and Counterclaims to Plaintiff's Complaint [Case No. 1:04–cv–02693–RLV / Served Oct. 1, 2004 / Atlanta, GA].

Plaintiff's Answer to Defendants' Counterclaims [Case No. 1:04–cv–02693–RLV / Filed Nov. 8, 2004 / Atlanta, GA].

Defendants' Motion for Leave to File Their Amended Answer [Case No. 1:04–cv–02693–RLV / Served May 19, 2005 / Atlanta, GA].

Defendants' Amended Answer, Affirmative Defenses and Counterclaims to Plaintiff's Complaint [Case No. 1:04–cv–02693–RLV / Filed Jun. 15, 2005 / Atlanta, GA].

Amended Complaint [Case No. 1:04–cv–02693–RLV / Filed Jul. 11, 2005 / Atlanta, GA].

Plaintiff's Answer and Affirmative Defenses to Defendants' Amended Answer, Affirmative Defenses & Counterclaims [Case No. 1:04–cv–02693–RLV / Filed Jul. 13, 2005 / Atlanta, GA].

Defendants' Answer, Affirmative Defenses and Counterclaims to Plaintiff's Amended Complaint [Case No. 1:04–cv–02693–RLV / Filed Aug. 1, 2005 / Atlanta, GA].

Plaintiff's Answer and Affirmative Defenses to Defendants' Counterclaims to Plaintiff's Amended Complaint [Case No. 1:04–cv–02693–RLV / Filed Aug. 24, 2005 / Atlanta, GA].

Joint Claim Construction Statement [Case No. 1:04–cv–02693–RLV / Filed Oct. 14, 2005 / Atlanta, GA].

Amended Joint Claim Construction Statement [Case No. 1:04–cv–02693–RLV / Filed Oct. 26, 2005 / Atlanta, GA].

[Proposed] Dismissal With Prejudice [Case No. 1:04–CV–02693–RLV / Filed Apr. 24, 2006 / Atlanta, GA].

U.S. District Court—S.D. of Florida (Miami), Civil Docket for Case No. 05–CV–22411, *Exigent Technology* v. *NuMind Software, et al.* (Dated Aug. 8, 2006 / Miami, FL).

Complaint [Case No. 05/CV–22411 / Filed Sep. 2, 2005 / Miami, FL].

Plaintiff's Motion for Transfer and Consolidation of this Action with Civil Action No. 04–CV–22140 [Case No. 05–CV–22411 / Filed Sep. 26, 2005 / Miami, FL].

Order of Transfer [Case No. 05–CV–22411 / Filed Oct. 3, 2005 / Miami, FL].

Order Granting Plaintiffs Motion to Consolidate . . . and Instructing Clerk of Court to Consolidate Action [Case No. 05–CV–22411 / Signed Oct. 7, 2005 / Miami, FL].

U.S. Court of Appeals for the Federal Circuit, Docket No. 2005–1338, *Exigent Technology* v. *Atrana Solutions*—Case Summary (Dated Aug. 10, 2006 / Washington, D.C.).

U.S. Court of Appeals for the Federal Circuit, Docket No. 2005–1338, *Exigent Technology* v. *Atrana Solutions*—Case Details (Dated Aug. 10, 2006 / Washington, D.C.).

U.S. Court of Appeals for the Federal Circuit, Docket No. 2005–1338, *Exigent Technology* v. *Atrana Solutions*—Listing of Briefs (Dated Aug. 20, 2006 / Washington, D.C.).

Brief of Appellant (Non–Confidential) [Docket No. 2005–1338 / Date of Brief: Jun. 13, 2005 / Washington, D.C.].

Brief for Defendant–Appellee (Non–Confidential) [Docket No. 2005–1338 / Dated Jul. 25, 2005 / Washington, D.C.].

Reply Brief of Appellant (Non–Confidential) [Docket No. 2005–1338 / Date of Brief: Aug. 12, 2005 / Washington, D.C.].

Decision [Docket No. 2005–1338 / Decided: Mar. 22, 2006 / Washington, D.C.].

U.S. Appl. No. 09/588,917; Notice of Allowance and Fee(s) Due; Dec. 11, 2001.

European Patent Application No. 01946160.7–2221; Official Communication; Feb. 16, 2004.

European Patent Application No. 03008798.5–1238; Official Communication; Sep. 27, 2004.

European Patent Application No. 03008798.5–1238; Official Communication; Oct. 9, 2003.

U.S. Appl. No. 09/642,600; Notice of References Cited; Mar. 26, 2003.

U.S. Appl. No. 09/578,356; Notice of References Cited; Jun. 6, 2001.

U.S. Appl. No. 09/578,356; Notice of References Cited; Apr. 18, 2002.

US 6,651,885 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4, 36 and 51 are cancelled.

Claims 1, 5, 8, 32, 37 and 47 are determined to be patentable as amended.

Claims 2, 3, 6, 7, 9–31, 33–35, 38–46, 48–50, 52 and 53, dependent on an amended claim, are determined to be patentable.

New claims 54–62 are added and determined to be patentable.

1. A multi-function transaction processing system comprising:
   a) a transaction terminal, said transaction terminal including a data entry facility and a transaction processor;
   b) said transaction processor of said transaction terminal being communicatively associated with at least a control processor;
   c) said data entry facility including a payment authority input structured to accept a payment authority;
   d) said control processor structured to define a user account and to issue an authorization code associated with said user account at least in response to said payment authority;
   e) a printer assembly communicatively associated with said transaction terminal and structured to generate a card assembly;
   f) said card assembly including at least a first portion and a second portion, said first portion including at least said authorization code thereon;
   g) said second portion including promotional materials; [and]
   h) said user accounting including a defined value at least partially defined by said payment authority, said authorization code structured to facilitate a transaction in accordance with said defined value;
   i) *said card assembly is generally elongate, said first portion being detachable from said second portion; and*
   j) *said payment authority input structured to receive an input related to an external payment verification, said external payment verification at least partially comprising said payment authority.*

5. A multi-function transaction processing system as recited in claim [4] *1* wherein said first portion of said card assembly is structured to be substantially compact.

8. A multi-function transaction processing system as recited in claim 1 wherein said payment authority input comprises a keypad [structured to receive an input related to an external payment verification, said external payment verification at least partially comprising said payment authority].

32. A multi-function transaction processing system comprising:
   a. a transaction terminal, said transaction terminal including a data entry facility and a transaction processor;
   b. said transaction processor of said transaction terminal being communicatively associated with at least a control processor;
   c. said data entry facility including a payment authority input structured to accept a payment authority;
   d. said control processor structured to define a user account and to issue at least one authorization code associated with said user account at least in response to said payment authority;
   e. a printer assembly communicatively associated with said transaction terminal and structured to generate a card assembly;
   f. said card assembly including at least said authorization code thereon;
   g. said user account including a defined value at least partially defined by said payment authority, said authorization code structured to facilitate a telephony communication in accordance with said defined value; [and]
   h. said card assembly being generally elongate and further including promotional materials thereon, said promotional materials being at least partially detachable from a portion of said card assembly containing said authorization code; and
   i. *said payment authority input structured to receive an input related to an external payment verification, said external payment verification at least partially comprising said payment authority.*

37. A multi-function transaction processing system as recited in claim [36] *32* wherein said transaction processor is structured to communicate said payment authority to said control processor, said control processor structured to at least partially add a value associated with said payment authority to said defined value of said user account.

47. A multi-function transaction processing system comprising:
   a. a transaction terminal, said transaction terminal including a data entry facility and a transaction processor;
   b. said transaction processor of said transaction terminal being communicatively associated with at least a control processor;
   c. said data entry facility including a payment authority input structured to accept a payment authority;
   d. said control processor structured to define a user account and to issue at least one authorization code associated with said user account at least in response to said payment authority;
   e. said user account including a defined value at least partially defined by said payment authority; [and]
   f. said authorization code structured to be provided to a merchant in connection with a purchase, an amount of said purchase being limited by said defined value of said user account associated with said authorization code; and
   g. *said payment authority input structured to receive an input related to an external payment verification, said external payment verification at least partially comprising said payment authority.*

54. *A multi-function transaction processing system comprising:* a) a transaction terminal, said transaction terminal including a data entry facility and a transaction processor;

b) said transaction processor of said transaction terminal being communicatively associated with at least a control processor;

c) said data entry facility including a payment authority input structured to accept a payment authority;

d) said control processor structured to define a user account and to issue an authorization code associated with said user account at least in response to said payment authority;

e) a printer assembly communicatively associated with said transaction terminal and structured to generate a card assembly;

f) said card assembly including at least a first portion and a second portion, said first portion including at least said authorization code thereon;

g) said second portion including promotional materials;

h) said user account including a defined value at least partially defined by said payment authority, said authorization code structured to facilitate a transaction in accordance with said defined value; and i) said payment authority input including a keypad structured to receive an input related to an external payment verification, said external payment verification at least partially comprising said payment authority.

55. A multi-function transaction processing system comprising:

a) a transaction terminal, said transaction terminal including a data entry facility and a transaction processor;

b) said transaction processor of said transaction terminal being communicatively associated with at least a control processor;

c) said data entry facility including a payment authority input structured to accept a payment authority;

d) said control processor structured to define a user account and to issue an authorization code associated with said user account at least in response to said payment authority;

e) a printer assembly communicatively associated with said transaction terminal and structured to generate a card assembly;

f) said card assembly including at least a first portion and a second portion, said first portion including at least said authorization code thereon;

g) said second portion including promotional materials;

h) said user account including a defined value at least partially defined by said payment authority, said authorization code structured to facilitate a transaction in accordance with said defined value;

i) said payment authority input including a keypad structured to receive an input related to an external payment verification, said external payment verification at least partially comprising said payment authority; and j) said transaction processor being further structured to require an access authorization in connection with said external payment verification at least so as to ensure a validity of said external payment verification.

56. A multi-function transaction processing system comprising:

a) a transaction terminal, said transaction terminal including a data entry facility and a transaction processor;

b) said transaction processor of said transaction terminal being communicatively associated with at least a control processor;

c) said data entry facility including a payment authority input structured to accept a payment authority;

d) said control processor structured to define a user account and to issue an authorization code associated with said user account at least in response to said payment authority;

e) a printer assembly communicatively associated with said transaction terminal and structured to generate a card assembly;

f) said card assembly including at least a first portion and a second portion, said first portion including at least said authorization code thereon;

g) said second portion including promotional materials;

h) said user account including a defined value at least partially defined by said payment authority, said authorization code structured to facilitate a transaction in accordance with said defined value; and i) said card assembly being defined from a segment of generally stiff material, said printer assembly structured to receive said segment of generally stiff material therethrough.

57. A multi-function transaction processing system comprising:

a) a point of sale terminal disposed at a merchant, said point of sale terminal, structured to process credit card transactions;

b) said point of sale terminal communicatively connected with a remotely located control processor;

c) said control processor structured to authorize said credit card transactions;

d) said point of sale terminal structured to communicate a request for an authorization code of a defined value to said control processor;

e) said control processor structured to communicate said authorization code to said point of sale terminal in response to said request;

f) a printer associated with said point of sale terminal;

g) a card formed from a generally stiff material, said card being elongate and having a first portion and a second portion detachably connected with one another; and h) said printer structured to receive said card therethrough with said first and said second portions attached to one another and to print on both portions of said card in response to receipt of said authorization code by said point of sale terminal.

58. A multi-function transaction processing system as recited in claim 57 wherein said authorization code comprises a pre-paid telephony PIN number.

59. A multi-function transaction processing system comprising:

a) a point of sale terminal disposed at a merchant, said point of sale terminal structured to process credit card transactions;

b) said point of sale terminal communicatively connected with a remotely located control processor;

c) said control processor structured to authorize said credit card transactions;

d) said point of sale terminal structured to communicate a request for an authorization code of a defined value to said control processor;

e) said control processor structured to communicate said authorization code to said point of sale terminal in response to said request;

f) said point of sale terminal further structured to receive a payment authority corresponding to a cash payment made independent of said point of sale terminal as payment for said authorization code;

g) a printer associated with said point of sale terminal;

h) a card formed from a generally stiff material, said card maintained independent from said printer and said point of sale terminal until needed; and i) said printer structured to receive said card therethrough and to print said authorization code thereon.

60. A new multi-function transaction processing system comprising:

a) a point of sale terminal disposed at a merchant, said point of sale terminal structured to process credit card transactions;

b) said point of sale terminal communicatively connected with a remotely located control processor;

c) said control processor structured to authorize said credit card transactions;

d) said point of sale terminal structured to communicate a request for an authorization code of a defined value to said control processor;

e) said control processor structured to communicate said authorization code to said point of sale terminal in response to said request;

f) a printer associated with said point of sale terminal;

g) a card formed from a generally stiff material, said card maintained independent from said printer and said point of sale terminal until needed; and h) said printer structured to receive said card therethrough and to print said authorization code thereon.

61. A multi-function transaction processing system as recited in claim 60 wherein said authorization code comprises a pre-paid telephony PIN number.

62. A multi-function transaction processing system as recited in claim 60 wherein said card is elongated and includes a first portion and a second portion detachably connected with one another, said printer structured to receive said card therethrough with said first and said second portions attached to one another and to print on both portions of said card in response to receipt of said authorization code by said point of sale terminal.

* * * * *